May 18, 1965 E. H. HARRISON, JR 3,184,614
TUNNEL DIODE COUNTER WITH DOUBLE COUNT CAPACITY PRODUCING STAIRCASE WAVEFORM HAVING BOTH ASCENDING AND DESCENDING STEPS
Filed Dec. 3, 1962 2 Sheets-Sheet 1

INVENTOR,
EDWIN H. HARRISON, JR.
BY S. J. Rotondi, A. J. Dupont & J. P. Edgerton May 18, 1965 E. H. HARRISON, JR 3,184,614

TUNNEL DIODE COUNTER WITH DOUBLE COUNT CAPACITY PRODUCING STAIRCASE WAVEFORM HAVING BOTH ASCENDING AND DESCENDING STEPS

Filed Dec. 3, 1962

2 Sheets-Sheet 2

United States Patent Office 3,184,614

Patented May 18, 1965

3,184,614

TUNNEL DIODE COUNTER WITH DOUBLE COUNT CAPACITY PRODUCING STAIRCASE WAVEFORM HAVING BOTH ASCENDING AND DESCENDING STEPS

Edwin H. Harrison, Jr., Vienna, Va., assignor to the United States of America as represented by the Secretary of the Army Filed Dec. 3, 1962, Ser. No. 242,025
3 Claims. (Cl. 307—88.5)
(Granted under Title 35 U.S. Code (1952), sec. 266)

The invention described herein may be manufactured and used by or for the Government of the United States of America for governmental purposes without the payment to me of any royalty thereon.

This invention relates to counting circuits and more particularly to circuits of the pulse-division type.

Since the introduction of the tunnel diode, many circuits have been designed to take advantage of its unusual impedance characteristics. One such group of circuits utilizes a plurality of series-connected tunnel diodes which are connected in series with a parallel combination of a constant current source and current pulse source. The pulses produced by the latter source are those which are counted by the circuit, the voltage appearing across the diode string representing the number of pulses which have been counted. Such circuits must contain reset circuitry which is adapted to return all of the diodes to their low voltage states after the maximum count has been achieved, the maximum count occurring when all diodes are in their high-voltage condition. The speed of counting of such circuits is limited in most practical cases, by the time required for reset, and the maximum count achievable with such devices is equal to the number of diodes in the string.

It is an object of this invention to double the counting capacity of a series-connected tunnel diode counting circuit.

It is another object of this invention to improve the double pulse resolution ability of such counting circuits, when such resolution ability is limited chiefly by the circuit reset means.

It is yet another object of this invention to produce a "staircase" waveform generator having both ascending and descending steps.

These and other objects will become more readily apparent from the following detailed description of this invention taken in connection with the drawings, in which:

FIG. 3(*b*) is a schematic diagram of a preferred form of the switch of FIG. 3(*a*).

FIG. 4(*b*) is a graph of the voltage across the diodes of FIG. 3(*a*) for a plurality of input pulses.

All of the prior art tunnel diode counting circuits of the multiple stable state type are similar in operation in that each one causes one additional tunnel diode to switch from its low voltage stable state to its high voltage stable state in response to each input current pulse until all diodes have been switched, after which they are all reset to their low voltage states. It is the purpose of the present invention to achieve the aforementioned improvements by replacing this prior art resetting procedure with one in which, after all of the diodes have attained their high voltage states, each additional current pulse causes a successive one of the diodes to return to its low voltage state. In other words, a series of input pulses first causes the series diode circuit voltage to increase incrementally until the maximum voltage is reached, in the manner taught by the prior art, and then causes the voltage across the diode circuit to decrease incrementally.

Figure 1:
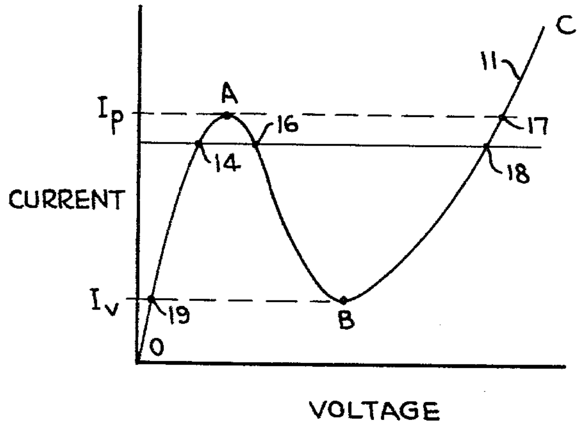
FIG. 1 is a current vs. voltage characteristic for a single tunnel diode.

Before describing the present invention and the preferred embodiment thereof it will be advantageous to examine the current vs. voltage, or impedance, characteristic exhibited bya single tunnel diode. This characteristic is shown in FIG. 1, and is represented by the curve 11. The horizontal line 12 is the load line for the diode when it is in series with a constant current source. With this load line, the diode can only operate at the points 14, 16, or 18. As observation of FIG. 1 will readily indicate, the tunnel diode exhibits the unusual impedance characteristic of having two distinct positive impedance regions, OA and BC. Between these two regions is a region of negative conductivity AB which is theoretically metastable but, due to the presence of considerable capacitance and some series inductance, is actuable unstable.

The shape of the tunnel diode curve 11 is made possible by heavy doping of the semiconductor elements and by the provision of a very narrow junction between these elements. When these two conditions are met, the high forward conduction region OA is produced through the mechanism of quantum mechanical tunneling. The region AB of the characteristic 11 represents that voltage interval when the energy levels of the two portions of the diode are such that the free electrons on one side of the junction have a decreasing number of holes on the other side junction to which they can "tunnel." The portion BC of the curve 11 represents the normal forward impedance characteristic of a p-n junction. The theory of the operation of these devices has been discussed a great deal and need not be considered in more detail here. A full discussion of the principles of their operation may be found in Hall, Tunnel Diodes, ED-7 IRE Transactions on Electron Devices, January 1, 1960.

If a tunnel diode having the characteristic shown in FIG. 1 were connected in series with a source of constant current, increasing current would cause the voltage across the diode to increase from O to the point A. The current at the point A is known as the peak current $I_p$. If the current through the diode were increased further, the voltage across the diode would be forced to "jump" to the point 17 on the portion BC of the curve 11. The speed of this voltage transition is in the nanosecond region and it is this characteristic of tunnel diodes which makes them desirable switching elements. If the current through the diode were then lowered, the voltage thereacross would follow the portion of curve 11 from the point 17 down to the point B. The current at this point known as the valley current $I_v$. A further decrease in diode current would force the voltage across the diode to switch back to the point 19 on the curve portion OA. The diode would then be prepared to repeat the cycle. When the diode is used as a switch the transition of the diode voltage from the point B to the point 19 is known as "resetting."

Figure 2:
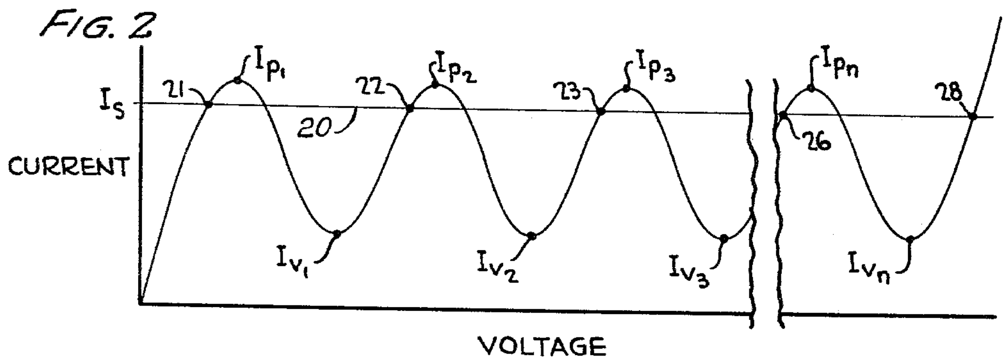
FIG. 2 is a composite current vs. voltage characteristic for a plurality of series connected diodes each of which has a characteristic similar to that shown in FIG. 1.

If a plurality of tunnel diodes were placed in series they would exhibit a current vs. voltage characteristic consisting of a series of current peaks and valleys. A typical characteristic for such a plurality of series connected diodes for the situation where the voltage is increasing is shown in FIG. 2 wherein each of the current peaks and its immediately succeeding valley current is contributed by one diode. Although every tunnel diode of a particular design has approximately the same current vs. voltage characteristic, the peak and valley current values for each diode will differ slightly from those for every other diode. Further, it is generally found that diodes having higher peak currents do not necessarily have lower or higher valley currents.

If the series-connected group of diodes represented by the curve of FIG. 2 were supplied by a source of constant current $L_s$, the circuit would operate along the load line 20. Initially the circuit would operate at the point 21 with the resultant voltage indicated for that point appearing across the series circuit. If a current pulse of sufficient amplitude to create a total current flow greater than the peak current $I_{p1}$ were applied to the diode circuit, or string, the diode having the peak current $I_{p1}$ would be switched from its low voltage state to its high voltage state with the result that the total voltage across the diode string would be equal to that at the point 22 on the load line 20. It has been found that when short current pulses of sufficient amplitude are applied to a series connected string of tunnel diodes only one diode switches from its low voltage state to its high voltage state for each current pulse. Further, the diodes will switch in the order of their peak currents $I_p$, the diode having the smallest peak current switching first and the diode having the largest peak current switching last. Of course, each subsequent switching function causes the total voltage across the diode string to increase by an incremental amount. It is this step increase which produces the counting information.

Circuits utilizing this characteristic of a series diode string must employ a resetting circuit. One form of such circuit senses the voltage across the string in order to determine when it has reached a point such as 28, representing the condition when all of the diodes have gone to their high voltage states. Upon sensing this voltage the resetting circuit reduces the current through the diode string to a point where it is below the lowest value of valley current $I_v$. This causes the diodes to all return to their low voltage states thus preparing the circuit to execute another count cycle. It should be noted that with these circuits the total number of pulses which can be counted is equal to the total number of diodes present in the string. Further, the double pulse resolution capability of such a circuit is, as a practical matter, limited by the time required for all of the diodes to reset, this time being longer than the time which it takes for any individual diode to go from its low-voltage to its high voltage stable state.

Figure 3B:
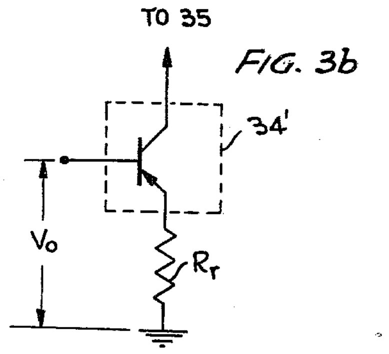
FIG. 3(*a*) is a block diagram of a system constructed according to the present invention.
Figure 3A:
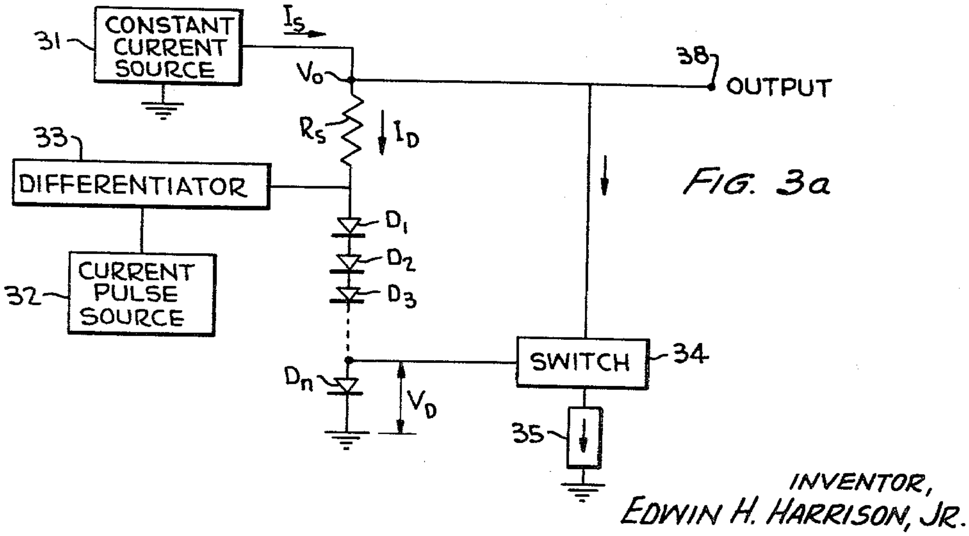

It is my intent to produce certain improvements in the operation of these prior art circuits. Specifically, I have conceived of a technique for doubling the counting capacity of a series circuit containing a given number of tunnel diodes. As one incident of this novel technique, the need for a time interval between successive pulses sufficient to enable all of the diodes to reset has been eliminated. FIG. 3 illustrates a preferred embodiment of my invention.

Turning now to FIG. 3(*a*) there is shown a tunnel diode counting circuit centered around the series string of tunnel diodes $D_1$, $D_2$, $D_3$ . . . and $D_n$. These diodes are connected to a constant current source 31 through an adjusting resistor $R_s$. The series combination of diodes is also connected so as to receive the output of differentiator 33. The input to the differentiator is supplied by current pulse source 32 so that the differentiated output is a series of "pulse twins." A "pulse twin" is here defined as a pair of current spikes, one of which is of positive polarity and the other of which is of negative polarity.

The current produced by the current source 31 is of such an amplitude as to cause the tunnel diodes to operate near their peak current, but is not high enough to cause them to switch to their high voltage states. These diodes are operating on a load line similar to the load line 20 of FIG. 2. The diode $D_n$ is so chosen as to have the highest peak current and the lowest valley current of all the diodes in the string. Therefore, this diode will be the last to switch from its low voltage state to its high voltage state.

When the circuit is operating on a load line that is close to the diode current peak, the amplitude of the current pulses produced by differentiator 33 are such that the addition of a positive current pulse to the output of current source 31 is sufficient to switch one tunnel diode from its low voltage state to its high voltage state, but the negative current pulses produced by differentiator 33 are not sufficient to cause the total diode current to fall below the highest valley current. Thus, each current pulse produced by the source 32 will cause one diode in the string to switch from its low voltage state to its high voltage state, with a resulting step increase in the amplitude of the output voltage applied to switch 34, at terminal 38. The last diode to be so switched will be the diode $D_n$. When this diode achieves its high voltage condition the voltage $V_D$ will appear thereacross. This voltage will be of a sufficient magnitude to turn the switch 34 "on." Switch 34 has one terminal connected to the output of current source 31 and another terminal connected to current source 35. The other terminal of current source 35 is connected to ground. Thus, when the voltage across the diode $D_n$ is such as to turn the switch "on," the current source 35 is connected to the junction of the output of current source 31, and one side of resistor $R_s$. The polarity of the current produced by source 35 is such as to cause a net reduction in the current flowing through the diode string i.e., some of the current is bypassed. The amplitude of the current produced by current source 35 is adjusted so that the value of the total current flowing through the string is slightly above the highest diode valley current.

Having described the general structure of the circuit of FIG. 3, its operation will be described in greater detail with reference to FIG. 4(*a*).

As has been previously noted, the diodes in the string switch from their low voltage states to their high voltage states in the order of increasing peak current values. Similarly, these diodes switch from their high voltage states back to their low voltage states in the inverse order of the values of their respective valley currents. This means that, since the amplitude of a diode's peak current is not related to the amplitude of its valley current, the order in which the diodes switch to their high voltage states will not necessarily be the inverse of the order in which the diodes switch back to their low voltage states during the operation of the system of this invention. Therefore, the current vs. voltage curve for increasing voltage is not identical with the curve for decreasing voltage. However, the differences between the two curves are so slight that it is only necessary to note this fact here. The remainder of this disclosure will treat the characteristic as being of a single shape for both increasing voltages and decreasing voltages, so that the graph of FIG. 4(*a*) will be utilized to discuss the operation of the circuit of this invention for both cases.

Figures 4A, 4B, 5A, 5B, 5C:
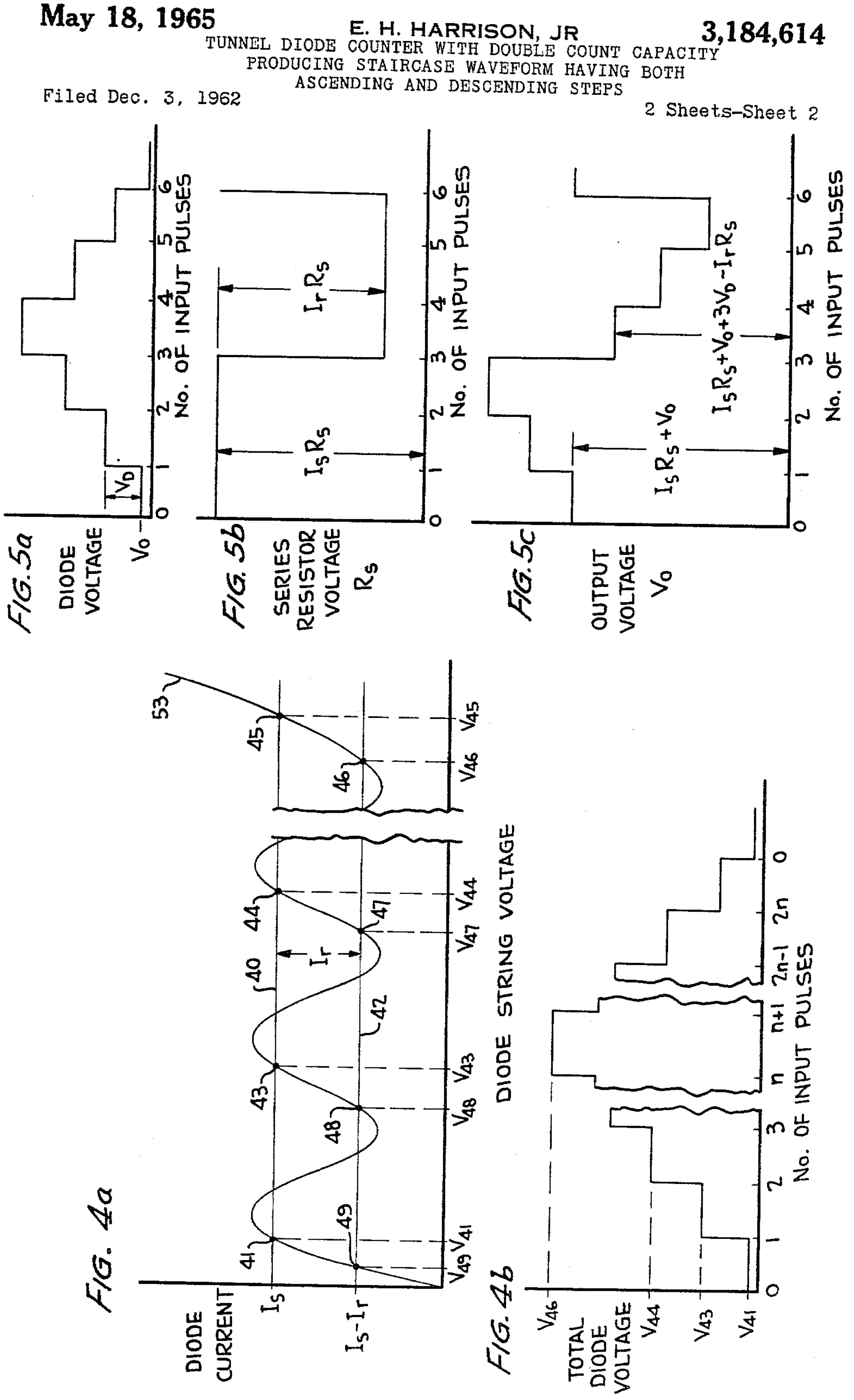
FIG. 4(*a*) is a graph of the impedance characteristic of the series diode string of FIG. 3(*a*).
FIG. 5 are diagrams of voltage vs. pulse input for the circuit of FIG. 4(*a*).

The load line 40 in FIG. 4(*a*) is that load line resulting from the application of a current $I_s$ to the diode string, when the switch 34 is open. This load line corresponds to load line 20 of FIG. 2. With the diode operating along this load line, the positive pulses produced at the output of differentiator 33 will be sufficient to cause the diodes $D_1$ to $D_n$ to sequentially switch with the result that the voltage across the entire diode string will increase incrementally in response to each positive pulse. For example, when the diodes are at operating point 41 on the composite diode characteristic curve 53 a positive pulse will cause a shift to the point 43, causing the voltage across the diode string to rise to the value $V_{43}$. In like manner the voltage across the diode string may be incrementally increased to $V_{44}$, and to as many other voltages as there are additional diodes, until the diode $D_n$ is turned on. Since, as was noted supra, the diode $D_n$ is chosen to have the highest peak current, this diode will be the last one to be switched and when it is switched, the voltage across the diode string will rise to $V_{45}$. The switching of this diode to its high voltage state, causing the voltage across it to equal $V_D$, will serve to turn the switch 34 "on." The switch 34 could be of any voltage controllable type; or the switch 34 and current source 35 could be made up of a single grounded-emitter transistor with a resistor in the emitter circuit, and with the voltage across the diode $D_n$ applied to the transistor base. Such a configuration will function effectively as a combination switch and constant current source, with the current passing through the transistor being approximately equal to the voltage applied to the base divided by the emitter circuit resistance.

Such a reset device is shown in FIG. 3(*b*) wherein a transistor 34' is controlled by the voltage $V_D$ appearing across the diode $D_n$ of FIG. 3(*a*). This switch is turned on by a base voltage which is equal to the voltage across the diode $D_n$ when that diode is in its high voltage state. The current drawn by this resetting circuit will be approximately equal to the voltage $V_D$ (less 0.1 to 0.2 volt drop across the emitter) divided by the emitter circuit resistance $R_r$. It should also be noted that since the differentiator 33 produces a positive and a negative pulse in response to each pulse produced by the current source 32, the current source 32 could be a source of either positive or negative current pulses or a random combination of the two.

The circuit of FIG. 3(*a*) could also be modified by the insertion of a time delay means between the diode $D_n$ and the switch 34. This delay could insure proper operation of the circuit when it is operating on that portion of the composite diode characteristic 53 of FIG. 4(*a*) where all of the diodes have switched to their high voltage states. The need for a time delay when the diodes are at this point may be seen from the fact that, if the switch means 34 were to be activated as soon as all the diodes had been shifted to their high voltage states (when the voltage across the diodes is equal to that represented by the voltage $V_{45}$ of FIG. 4(*a*)), the load line on which the diodes would be operating might shift down to the point 46 before the negative spike of the output of differentiator 33 had been applied to the diode string. This would result in a shift of the voltage across the diodes from the point 46 to the point 47, thereby indicating two counts for one pulse from source 32. The use of a delay device to insure that switch 34 is not closed until sometime after the negative portion of a differentiator output for a particular current pulse from source 32 would eliminate this difficulty. The constant current source 31 could be of any well-known type such as a voltage source associated with a high series impedance. The differentiator 33 could be of any well known type such as a simple R-C circuit.

When the switch 34 is turned on, the resulting current $I_D$ flowing through the diode string decreases from the value $I_s$ to the value $(I_s - I_r)$, the current $I_r$ being that produced by current source 35. This current $I_r$ is so selected as to cause the diode string to operate along the new load line 42, which line is above the highest valley current value present in the diode string. Since this downward shift in the load line occurs as soon as the diode $D_n$ switches to its high voltage state the voltage across the diodes does not remain at the value $V_{45}$ for any significant length of time, but shifts almost immediately down to the value $V_{46}$. Examination of this new load line 42 should immediately make obvious the purpose of the negative pulses produced at the output of differentiator 33. With the load line at the position 42, the positive pulses produced at the output of differentiator 33 are not of sufficient amplitude to cause the total current through the diode string to exceed the diode peak current values, but the negative pulses are of sufficient amplitude to cause the total diode current to go below the valley current points. Thus, when the diode string is operating on the load line 42, each pulse pair produced at the output of differentiator 33 will cause one diode to switch from its high voltage state to its low voltage state. The voltage across the diode string will then decrease sequentially to the values $V_{47}$, $V_{48}$, and $V_{49}$. When the voltage across the diodes reaches the value $V_{49}$ all of the diodes, including diode $D_n$, will have returned to their low voltage states. This will cause the switch 34 to open, changing the value of current $I_d$ back to $I_s$, and causing the load line along which the diodes are operating to shift back to the position illustrated by the line 40 on FIG. 4(*a*). The counting circuit is then prepared to repeat the entire counting cycle.

The variation in voltage across the diode string, for a diode circuit having the composite characteristic of FIG. 4(*a*), is shown in FIG. 4(*b*). This figure shows the curve of voltage across the entire diode string vs. the number of pulses which have been applied to the diodes, or the "pulse count". Each voltage level is labeled in accordance with its associated operating point on the curve 53 of FIG. 4(*a*). As should be noted from an inspection of the curve 53 of FIG. 4(*a*), the voltage levels across the diode string when these diodes are being sequentially switched to their low voltage states differs slightly from those levels which exist when the diodes are being switched in the other direction. This is due to the fact that the stable portions of the curve 53 have a finite slope, so that the change in load line from the position 40 to the position 42 causes these slight variations. However, these slopes are normally so steep that these slight voltage differences are not adequate to eliminate the ambiguity between the voltages representing those pulses which are counted when the diodes are operating on the load line 40 and the voltage produced while the diodes are on the load line 42. A proper choice of the value for the series resistor $R_s$ will eliminate this ambiguity. The result of placing this resistor in series with the diode string will now be described in connection with FIGS. 5(*a*), (*b*) and (*c*).

The graphs of FIG. 5 represent the voltages across the diode string, across the series resistor $R_s$, and across both units. The curves are for a counting circuit having three diodes. This small number of diodes is employed for the sake of simplicity but any number may of course be used. Turning now to FIG. 5(*a*), there is shown a curve which is similar in form to that of FIG. 4(*b*). The voltage appearing prior to the first input pulse represents the voltage at the point 41 of the curve of FIG. 4(*a*) and is quite small in comparison with the voltage across any one of the diodes when it is in its high voltage state. This voltage $V_o$ represents the voltage across the diode string when all of the diodes are in their low voltage states. The voltage produced by any one diode in its high voltage state is represented in FIG. 5(*a*) by the value $V_D$. Each incremental increase of voltage is approximately equal to $V_D$, as is each decrease. Since the counting circuit represented by the graph of FIG. 5(*a*) has only three diodes, its reset switch will be activated by the third input pulse. This will cause the total current through the series combination of $R_s$ and the diode string to decrease. However, as may be seen from FIG. 4(*a*) this decrease in total current will have very little effect on the total voltage appearing across the diode string, the small change occurring being represented in FIG. 4(*a*) by the difference between $V_{45}$ and $V_{46}$. However, the change in current will obviously cause a substantial change in the voltage appearing across the series resistor $R_s$, since turning on switch 34 of the circuit of FIG. 3(*a*) causes the total current passing through the resistor $R_s$ (in the absence of current pulses from source 32) to decrease by an amount equal to $I_r$. This will result in a resistor voltage decrease which is equal to $I_r R_s$. This change in voltage is indicated in FIG. 5(*b*). Since the voltage appearing at output terminal 25 is equal to the sum of the voltages across the diode string and the series resistor, the change in voltage across the resistor when the switch 34 is open will cause a shift of the voltage level appearing at terminal 35. Since this opening of switch 34 causes the current through the series resistor to decrease, the voltage thereacross will shift downward at the moment the switch is closed and will remain at this lowered value until the switch 34 again opens. FIGURE 5(*c*) illustrates the total voltage appearing at terminal 35 during a complete counting cycle. During the time between the turning on of the circuit and the occurrence of the third input pulse from source 32, the output voltage is the sum of the incrementally increasing voltage across the diode string and the higher voltage ($I_S R_S$) across the series resistor $R_S$. When the switch 34 closes, indicating that the last diode in the string has been switched to its high voltage state, the voltage across $R_S$ decreases so that the range of voltages appearing at the output of terminal 35 when the switch 34 is closed is completely separate from the range of voltages appearing during the interval prior to the occurrence of the third pulse. As is indicated in FIG. 5(*c*), these two regions will be mutually exclusive as long as $(3V_D - I_r)R_s$ is less than zero. For the general case where *n* diodes are used, $(nV_D - I_r)R_s$ must be less than zero.

It will be apparent that the embodiment shown is only exemplary and that various modifications can be made in construction and arrangement within the scope of the invention as defined in the appended claims.

I claim as my invention:

1. An improved tunnel diode counter of the type having a plurality of series-connected tunnel diodes which are maintained at a predetermined bias by a bias current with all of the diodes initially at one stable voltage level, said tunnel diodes switching to their second voltage level successively in response to successive counting pulses of a predetermined magnitude which are applied to said diodes, the improvement lying in improving the capacity and speed of said tunnel diode counters by the addition of circuitry comprising:

(*a*) means to derive one positive and one negative current pulse from each said counting pulses, the output of said deriving means being applied to said tunnel diode counter circuit, (*b*) means to change said bias current after predetermined number of said diodes have switched from a first value, where positive current pulses only are effective to successively switch said diodes from a first voltage level to their second voltage level, to a second bias level where said negative current pulses only are effective to switch said diodes from their second voltage level to their first voltage level.

2. The improved tunnel diode counter circuit as in claim 1 wherein said means to derive positive and negative pulses is a differentiator circuit.

3. The improved tunnel diode counter circuit as in claim 1 wherein said means to change includes a transistor switch and impedance connected in parallel with said series connected tunnel diodes, said impedance being of such a value as to maintain the current through said tunnel diodes at said second bias level when said switch is on.

References Cited by the Examiner

UNITED STATES PATENTS

| | | | |
|---|---|---|---|
| 3,094,630 | 6/63 | Rapp et al. | 307—88.5 |
| 3,094,631 | 6/63 | Davis | 307—88.5 |

OTHER REFERENCES

Pub. I, "G.E. Tunnel Diode Manual," by General Electric Co., dated Mar. 20, 1963, pages 47–48 and Fig. 5.6 relied on.

ARTHUR GAUSS, *Primary Examiner.*